2,586,759

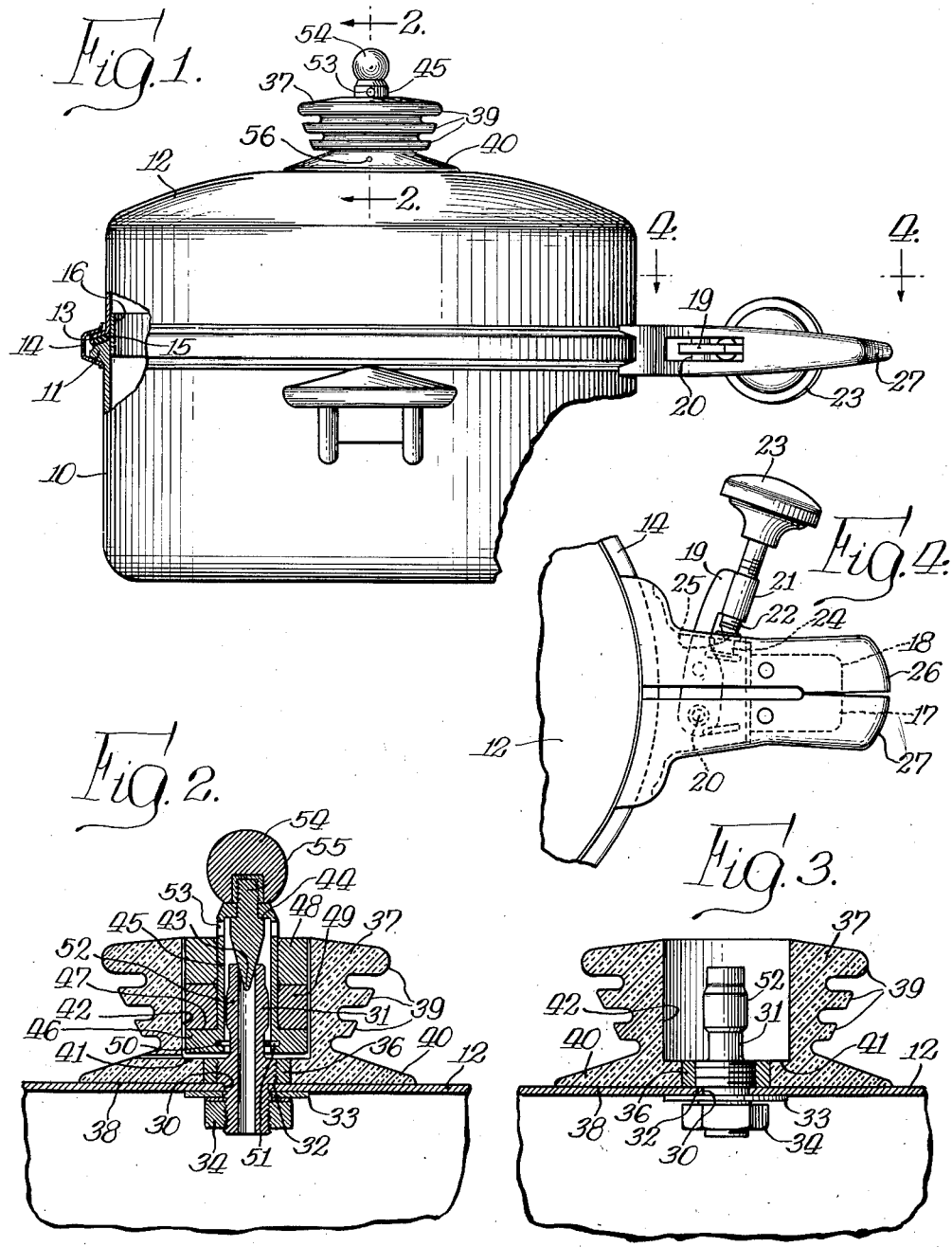
Feb. 19, 1952 — M. J. ZIMMER — 2,586,759
PRESSURE RELIEF VALVE ASSEMBLY
Filed April 4, 1947
INVENTOR.
MYRON J. ZIMMER Patented Feb. 19, 1952

UNITED STATES PATENT OFFICE 2,586,759

PRESSURE RELIEF VALVE ASSEMBLY

Myron J. Zimmer, Wood Dale, Ill., assignor to Ekco Products Company, Chicago, Ill., a corporation of Illinois Application April 4, 1947, Serial No. 739,393

6 Claims. (Cl. 137—53)

This invention relates to improvements in a pressure relief valve assembly, and more particularly to a device of this character adapted for use in connection with pressure cookers.

It is an object of this invention to provide a pressure relief valve assembly wherein a steam escape vent tube, adapted to be mounted on the cover of a pressure cooker or the like for communication with the interior of the utensil, is provided with valve means adapted to seat by gravity on the upper end of said tube to vary the exposure of said upper end of the tube and to close it, in combination with a hollow casing secured to the base of the tube above said cover and defining a chamber about the tube throughout the height of the latter in which the valve means are loosely confined and guided when moved axially of the tube toward and away from a seated position thereon, said casing having an opening at its upper end of a size to permit unobstructed withdrawal of the valve means therefrom.

It is a further object of this invention to provide such a casing which also affords a handle for convenient manipulation thereof during cooking operations and of such design and construction as to assure protection against injury to the hand of an operator by conduction of heat thereto from the cover or the steam escape vent when the cover is so manipulated.

Further objects and advantages of the invention will be apparent to those skilled in the art as a description thereof proceeds with reference to the accompanying drawing in which:

Figure 1 is a fragmentary side elevation view of a pressure cooker having a cover provided with valve mechanism embodying this invention.

Fig. 2 is an enlarged fragmentary vertical section on line 2—2 of Fig. 1.

Fig. 3 is a similar view with parts removed to show details of construction of the interior of the casing.

Fig. 4 is a fragmentary top view of a portion of the mechanism operable to maintain the cover in locked position on the cooker.

In the embodiment of this invention as shown in the drawings the reference numeral 10 designates a receptacle or a vessel having an opening in its top portion and provided with an external bead 11 surrounding said opening. A closure or cover 12 adapted to close the opening in the vessel 10 and cooperating therewith to form a steam tight chamber within the latter is also provided with an external bead 13. A clamping band 14 of channel-shaped construction is adapted to embrace the beads 11 and 13 and to be drawn tightly into a position to clamp the cover and vessel in steam tight relation.

A gasket 15, retained on the cover by means of a ring 16 suitably fastened to the inner surface of the cover, aids in maintaining such steam tight relation.

A bracket 17 suitably fastened to one end of the band 14, and a similar bracket 18 secured to the other end of the band 14, are forced toward each other to draw the band into clamping position, as aforesaid, by means of a link 19 pivoted to the bracket 17 as at 20 and a nut 21 formed on the link 19 by manual turning of a screw 22 operable in said nut 21 to engage a depression or seat 25 formed in a lug 24 on the bracket 18.

A shell-like element 26, preferably of heat-resistant construction, secured to the bracket 18, and a similar element 27 secured to the bracket 17, cooperate to provide hand-gripping members to facilitate manipulation of the cooking utensil when the clamping band is in operative position to maintain the cover and vessel in steam tight relation as well as to aid in the application of the clamping band to, or removal of the clamping band from, operative engagement with the bead of the cover and the vessel.

The center of the cover 10 is pierced by an opening 30 in which a tube 31 is fitted so as to project above and below the cover 10 to provide a vent through which steam confined within the vessel may escape to the atmosphere. This tube 31 is formed with a shoulder 32 which bears downwardly on the outer surface of the cover surrounding the opening 30. A washer 33 surrounding the tube 31 and seated against the inner surface of the cover 10 surrounding the opening 30 is securely held in place by means of a nut 34 having threaded engagement with the externally threaded lower portion of the tube 31. Threads formed on the external portion of the tube above the cover 10 are engaged by an internally threaded bushing 36 suitably anchored in a hollow casing 37 whereby the latter is rigidly secured with its bottom surface 38 in contact with and extending over a substantial area of the outer surface of the cover 10 surrounding said tube 31. The casing 37 is preferably constructed of a heat resistant material such as Bakelite, and is formed with a series of vertically spaced continuous fins 39 of gradually increasing peripheral dimension in a direction upwardly of the cover 10. A base portion 40 of the casing 37 below the lowermost fin 39 presents a downwardly and outwardly inclined upper surface which extends laterally beyond a vertical projection of the upper peripheral limits of the casing defined by the topmost fin 39. Accordingly the downwardly and inwardly inclined arrangement of the peripheral limits of the fins 39 and the upper surface of the base portion 40 of the casing cooperate to form a handle which may be conveniently grasped by the fingers of the user and at the same time shields the fingers from direct contact with the bare surface of the cover 10, so as to avoid burns from the cover when heated by the cooking operation.

The casing 37 is further provided with an upwardly opening central cylindrical well or recess defining a horizontal bottom wall 41 at a distance materially below the upper limits of the tube 31 and a side wall 42 rising upwardly therefrom which is spaced substantially away from sides of the tube 31. The opening in the top of the tube 31 is adapted to provide a seat for a cone-shaped valve member 43. The member 43 extends downwardly from a head 44 closing the upper end of a sleeve 45 which is adapted to be removably fitted over the tube 31. The sleeve 45 is provided with a base 46 of such dimension as to provide an upwardly facing shoulder or platform 47 about the lower end of the sleeve 45. The latter surface is adapted to support a pair of superposed annular weights 48 and 49 which are designed to slide over the sleeve 47 so as to alter the load on the valve member 43 in accordance with the desired pressure limits to be controlled thereby.

A resilient locking ring 50 is mounted in a recess 51 opening inwardly from the interior of the sleeve 45, which ring is adapted to be spread so as to clear a peripheral enlargement 52 formed in the cooperating surface of the tube 31 when the sleeve is being applied to, and moved toward an operative position over, the tube 31 as shown in Fig. 2. Normally the ring takes a contracted shape so as to be engaged by the shoulder at the lower end of the enlargement 52 on the tube 31 as the sleeve 45 is raised a limited distance from such operative position whereby accidental withdrawal of the sleeve 45 from the tube 31 is effectively prevented. As steam pressure within the vessel 10 builds up to about fifteen pounds so as to create a force sufficient to raise the cone-shaped valve member 43 loaded by the weights the steam will enter the interior of the sleeve 45 and escape through openings 53 formed in the side wall thereof. The sleeve 45 is provided with a heat resistant knob or handle 54 of suitable design removably secured in any suitable manner to a stub or shank 55 projecting upwardly from the head of the sleeve 45 by which knob 54 the sleeve 45 may be manually lifted for removal from the tube 31. Such removal of the sleeve 45 exposes the opening at the upper end of the tube 31, as shown in Fig. 3, so that the steam may be quickly released from the cooker, when so desired.

If it is desired to maintain a lower pressure within the vessel, the weights 48 and 49 may be removed from the sleeve 45 by unscrewing the handle 54, which otherwise obstructs withdrawal of said weights, whereby the load of the sleeve is reduced so as to be lifted by a relatively lower pressure, such as five pounds, for example. Removal of only one weight will accordingly effect a load on the sleeve to resist lifting under an intermediate pressure, such as ten pounds.

Water which may collect on the bottom wall 41 due to condensation of the escaping steam, is conveniently drained therefrom through a suitable bore 56 formed in the base 40 of the casing, as shown in Fig. 1.

What is claimed is:

1. A pressure relief valve assembly comprising a steam escape vent tube adapted to be mounted on the cover of a pressure cooking utensil for communication with the interior of said utensil, a valve seat at the upper end of said tube, valve means adapted to seat by gravity on said seat including a sleeve adapted to telescope said tube, and a hollow casing secured to the base of the tube and defining a chamber about the tube throughout the height of the latter in which the valve means are loosely confined and guided when moved axially of the tube toward and away from said valve seat, said casing having an opening at its upper end of a size to permit unobstructed withdrawal of the valve means therefrom.

2. A pressure relief valve assembly as defined in claim 1 wherein said casing is formed of heat insulating material.

3. A pressure relief valve assembly as defined in claim 1 wherein said casing is formed of heat insulating material and provided with a series of external vertically spaced heat dissipating fins.

4. A pressure relief valve assembly as defined in claim 1 wherein said casing is of heat insulating material having a series of external vertically spaced heat dissipating fins and an exterior base portion presenting a downwardly and outwardly inclined upper surface extending beyond the peripheral limits of the fin next upwardly therefrom.

5. A pressure relief valve assembly as defined in claim 1 wherein said casing is formed of heat insulating material with a series of integral exterior vertically spaced heat dissipating fins of gradually increasing peripheral dimension in an upward direction.

6. A pressure relief valve assembly as defined in claim 1 wherein said casing is formed of heat insulating material and the base of said casing is provided with a drainage passage in communication with the bottom of the chamber defined by said casing about said tube.

MYRON J. ZIMMER.

REFERENCES CITED

The following references are of record in the file of this patent:

UNITED STATES PATENTS

| Number | Name | Date |
| --- | --- | --- |
| 240,369 | Blake | Apr. 19, 1881 |
| 1,638,589 | Louw | Aug. 9, 1927 |
| 1,834,837 | Hashimoto | Dec. 1, 1931 |
| 2,105,971 | Grigg et al. | Jan. 18, 1938 |
| 2,200,903 | Stephens | May 14, 1940 |
| 2,284,748 | Korenek | June 2, 1942 |
| 2,308,320 | Stephens | Jan. 12, 1943 |
| 2,428,483 | Wittenberg | Oct. 7, 1947 |

FOREIGN PATENTS

| Number | Country | Date |
| --- | --- | --- |
| 78,173 | Austria | of 1919 |